United States Patent
Hirschberg

[15] 3,699,509
[45] *Oct. 17, 1972

[54] SEISMIC SYSTEM FOR REAL-TIME REPORTING

[72] Inventor: Kenneth A. Hirschberg, Saratoga, Calif.

[73] Assignee: The United States of America as represented by the Secretary of the Army

[*] Notice: The portion of the term of this patent subsequent to Nov. 25, 1986, has been disclaimed.

[22] Filed: Oct. 21, 1969

[21] Appl. No.: 868,142

[52] U.S. Cl. .................. 340/15, 340/258 D, 340/261
[51] Int. Cl. ............................................. G01v 1/16
[58] Field of Search ...................... 340/15, 261, 25 D

[56] References Cited

UNITED STATES PATENTS

| | | |
|---|---|---|
| 3,517,316 | 6/1970 | Anderson et al. ....181/0.5 UM |
| 3,138,778 | 6/1964 | Dulin ........................... 340/15 |
| 3,475,751 | 10/1969 | Sontag et al. ............... 340/261 |
| 3,480,942 | 11/1969 | Hirschberg .................. 340/15 |

Primary Examiner—Benjamin A. Borchelt
Assistant Examiner—N. Moskowitz
Attorney—Harry M. Saragovitz, Edward J. Kelly and Herbert Berl

[57] ABSTRACT

A seismic system for real-time directional reporting for providing radio signals indicating the direction and location of traffic along a path wherein two geophones positioned adjacent said path and spaced from each other are each connected to separate channels each of which includes amplifier means coupled to an integrator capacitor which in turn is coupled to a trigger circuit whereby the signals developed by the geophone are converted to a sharp trigger pulse. The output of each channel is coupled through a diode to a one-shot multivibrator whose output is coupled to a transistor switch in series with the emitter circuit of a transistor audio frequency oscillator and power supply whereby when a trigger pulse from either channel is applied to the one-shot multivibrator the audio frequency oscillator is activated for the period of the one-shot multivibrator. The trigger pulses of the channels are also connected to the inputs of a flip-flop which is set by one channel and reset by the other. The output of the flip-flop is coupled to a transistor switch in series with an astable multivibrator and the power supply whereby said astable multivibrator may be activated when the transistor switch is enabled by the flip-flop.

5 Claims, 3 Drawing Figures

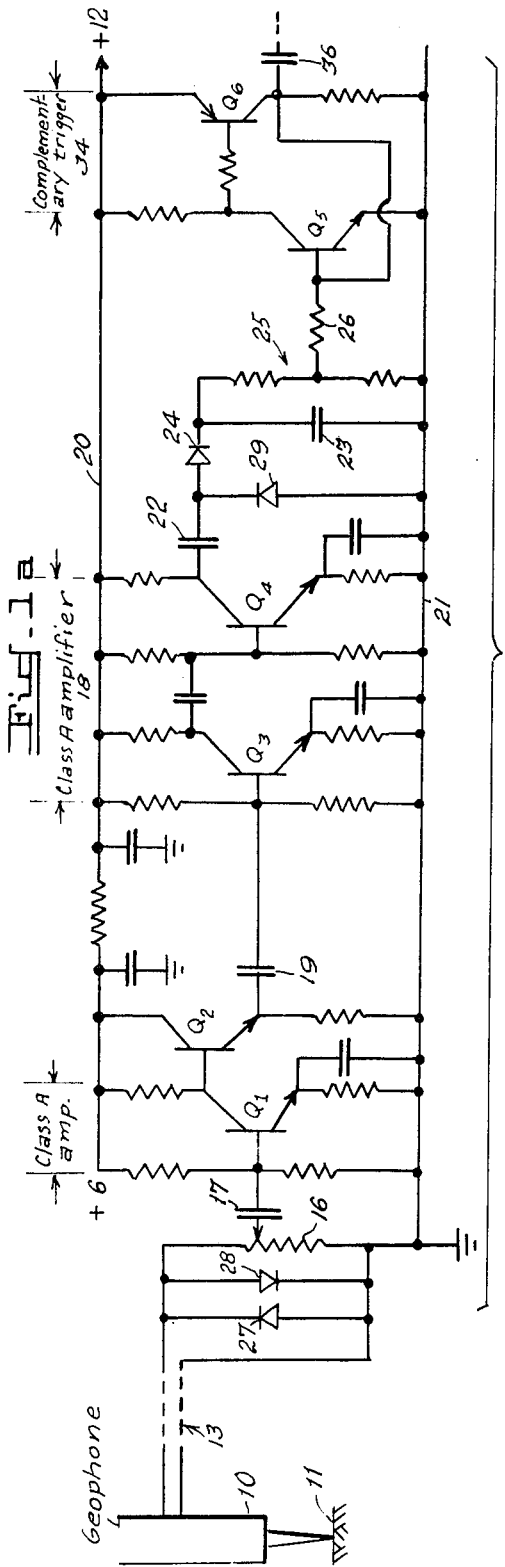
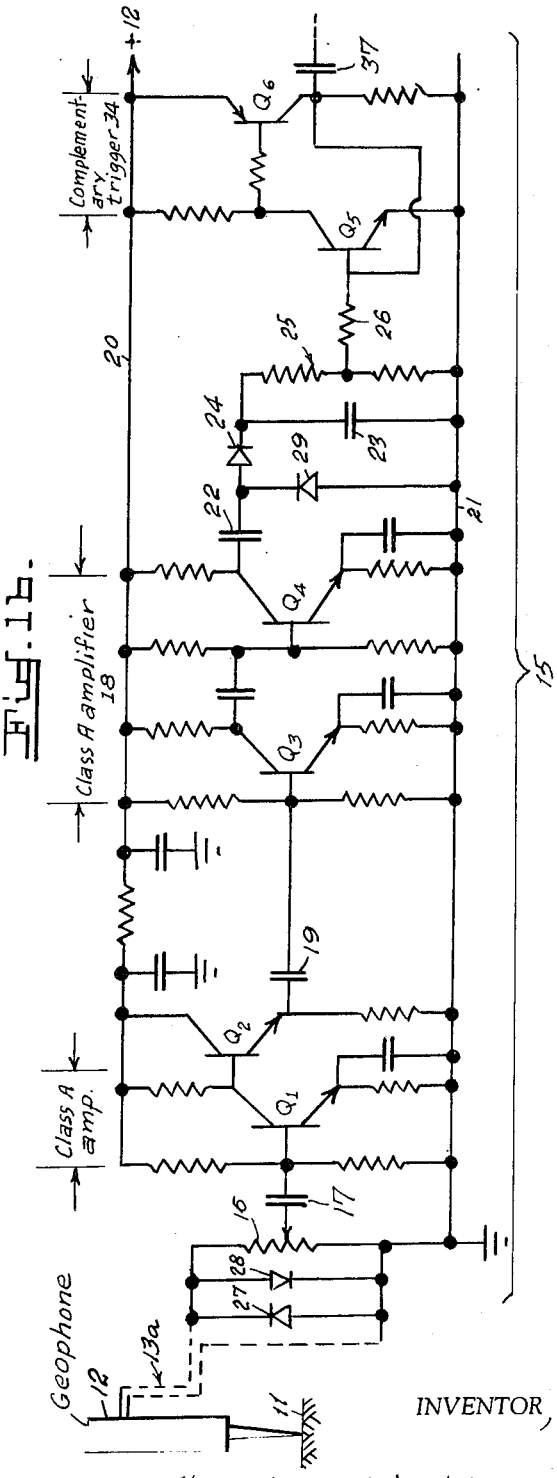

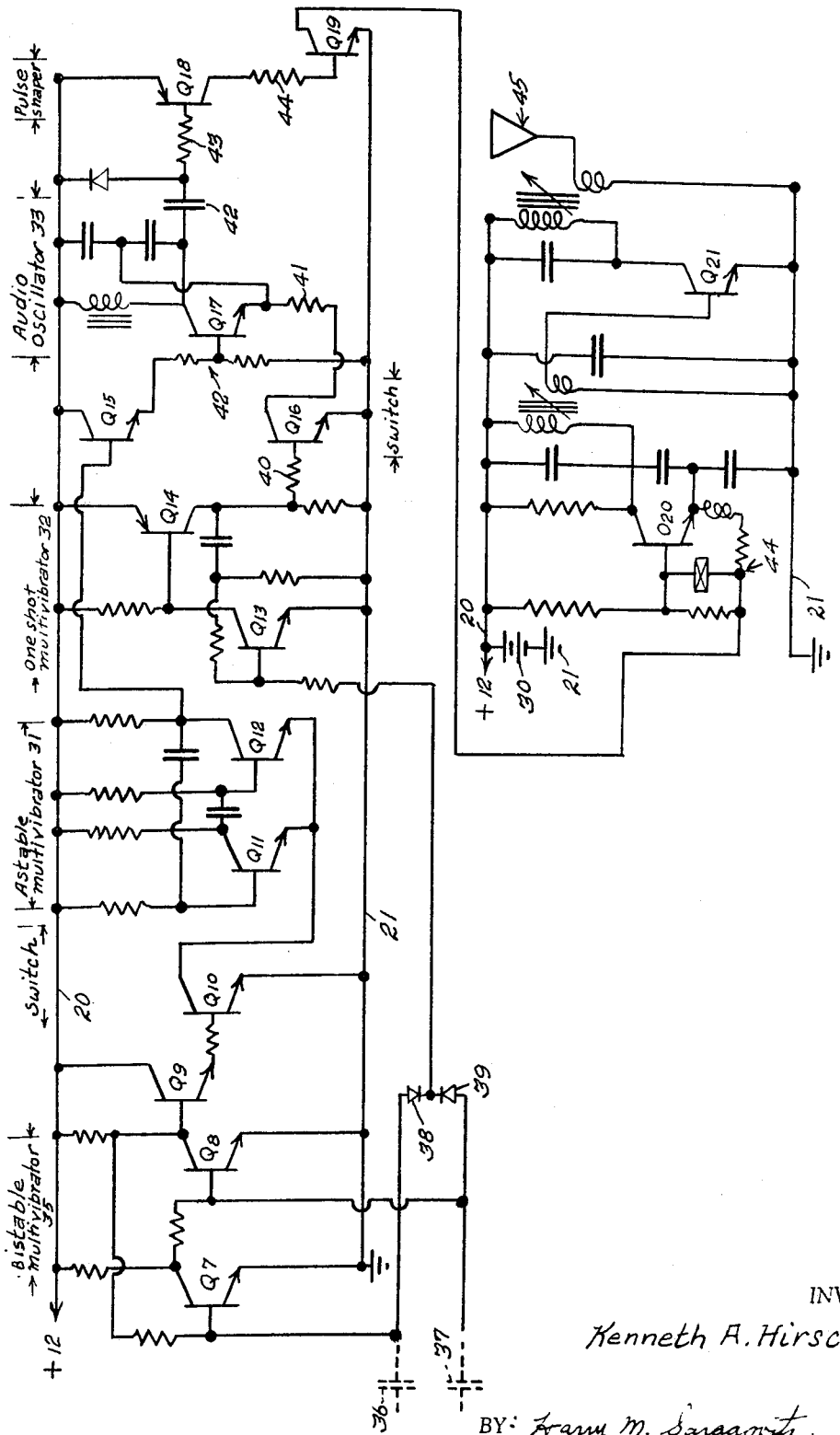

SEISMIC SYSTEM FOR REAL-TIME REPORTING

This invention relates to seismic systems for remote monitoring of roads and trails in order to determine the volume and direction of traffic thereon.

Accordingly, an object of the invention is apparatus for detecting movement of troops or equipment which may occur at either one or two spaced locations along a path and the direction of such movement if it passes between the spaced locations.

Another object of the invention is an unmanned transmitting seismic sensor system wherein seismic sensors are positioned at spaced locations adjacent a path and coupled to unmanned electronic apparatus which transmits characteristic identifying radio signals in response to the seismic sensors to remote radio receiver means indicating the location of persons or equipment moving in the vicinity of the sensor and the direction of such movement if it passes both spaced sensors.

A still further object of the invention is a seismic system for real-time reporting utilized in the remote monitoring of roads and trails in order to determine the volume and direction of traffic thereon.

The invention will be more fully understood from the following detailed description taken in connection with the drawings wherein like characters identify like elements and in which:

FIG. 1a, FIG. 1b and FIG. 1c comprise a schematic diagram of the invention.

Referring to FIG. 1a, a geophone 10 is placed in contact with the earth adjacent a trail 11 for detection of acoustic waves generated therein due to troop or equipment movement along the trail in the vicinity of geophone 10. A second geophone 12, FIG. 1b, is placed in contact with the earth adjacent trail 11 but remotely located in respect to geophone 10 for detection of acoustic waves generated therein due to troop or equipment movement along the trail in the vicinity thereof.

Geophone 10 is coupled by means of cable 13 to the input of amplifier-integrator-trigger channel 14, FIG. 1a, whereby the electric signals generated by geophone 10 in response to the above mentioned acoustic waves are amplified and subsequently presented as a sharp trigger pulse at the output of channel 14. In a similar manner geophone 12 is coupled by means of cable 13a to amplifier-integrator-pulse channel 15, FIG. 1b, which is identical to channel 14 and functions in an identical manner in regard to disturbances along the trail in the vicinity of geophone 12. Since channels 14 and 15 are identical in structure and function, it is to be understood that the following description of channel 14 to be equally applicable to the structure and function of channel 15.

The seismic signal voltage generated by geophone 10 in response to the aforementioned movement along trail 11 is applied across the resistance element of potentiometer 16 by means of cable 13, the rotatable arm of potentiometer 16 being coupled to the base electrode of class A amplifier $Q_1$ by means of capacitor 17 whereby said signals are applied to amplifier $Q_1$. A pair of back to back connected diodes 27 and 28 are coupled across potentiometer 16 to prevent over-voltage damage to amplifier $Q_1$. The output of amplifier $Q_1$ is directly coupled to emitter follower $Q_2$, the output of which is capacitively by means of capacitor 19 coupled to the input of two stage class A amplifier 18, transistors $Q_3$ and $Q_4$, for further amplification of the generated seismic signal voltage. The output of amplifier 18 taken at the collector electrode of transistor $Q_4$ is coupled by means of D.C. blocking capacitor 22 to rectifier diode 24 which rectifies said output to charge integrator capacitor 23 which is in series with diode 24 and negative poled conductor or common circuit 21. Diode 29 coupled between the junction formed by D.C. blocking capacitor 22 and rectifier diode 24 and the common circuit 21 serves to clamp the output of amplifier 18 above ground. Voltage divider 25 in shunt with integrator capacitor 23, providing a discharge path for integrator capacitor 23, has an intermediate point coupled through resistor 26 to the base electrode of transistor $Q_5$ of complementary trigger 34 whereby a percent of the integrator voltage is applied to and triggers complementary trigger 34 resulting in a sharp trigger pulse at the collector electrode of transistor $Q_6$ which occurs when the seismic signal is of sufficient strength and repetition rate. Complementary trigger 34 thus switched on remains in this state and cannot provide another pulse as long as integrator capacitor 23 remains charged.

Geophone 12 which is in contact with the earth adjacent trail 11 but at a location remote from geophone 10 also developes electrical output signals in response to acoustic waves in the earth at this second location due to troop or equipment movement in the vicinity thereof. The electrical output signal thus generated by geophone 12 is coupled to the input of amplifier-integrator-trigger channel 15, identical to channel 14, by means of cable 13a and processed in the same manner as described in conjunction with channel 14 to produce a sharp trigger pulse at the output thereof. Thus, as subsequently disclosed, disturbances at either location may be identified as well as the direction of movement of such disturbances between said locations.

A power supply 30, FIG. 1c, is directly coupled across the various electronic units of the transmitting seismic sensor system by means of the positive poled conductor 20 and negative poled conductor 21 with the exception of astable multivibrator 31, audio frequency oscillator 33, and crystal controlled radio frequency oscillator $Q_{19}$ each of which have one power input directly connected to conductor 20 and another power input coupled through a transistor switch to conductor 21.

The output pulse of channel 14 taken at the collector of transistor $Q_6$ is capactively coupled by means of capacitor 36 to one input of flip-flop multivibrator 35, transistors $Q_7$ and $Q_8$, FIG. 1c, at the base of transistor $Q_7$ and the output pulse of channel 15 taken at the collector of transistor $Q_6$ of this channel is coupled by means of capacitor 37 to the base of transistor $Q_8$ whereby the flip-flop 35 is set by the output of one of said channels and reset by the output of the other of said channels. Further description of flip-flop 35 and description of circuitry associated therewith in regard to switching audio frequency oscillator 33 on for a steady tone or off and on whereby a series of signals of short duration or "beeps" are generated is contained in the following. The output pulse of channel 14 is also applied to the input of a one-shot multivibrator 32, transistors $Q_{13}$ and $Q_{14}$, through a diode 38 connected between capacitor 36 and the input of one-shot multivibrator 32 and the output pulse of channel 15 is similarly applied to the input of one-shot multivibrator 32 by means of capacitor 37 and diode 39 whereby the one-shot multivibrator 32 cycles in response to either or both said pulses for its period of transmission which in one embodiment is 20 seconds. An audio frequency oscillator 33, transistor $Q_{17}$, has its emitter circuit coupled to common circuit 21 by means of transistor switch $Q_{16}$. The collector of switch $Q_{16}$ is coupled through emitter resistor 41 to the emitter of transistor $Q_{17}$, the emitter thereof is connected to common circuit 21 and the base thereof is connected through resistor 40 to the output of one-shot multivibrator 32 at the collector of transistor $Q_{14}$. Thus, it can be seen that when pulses from channels 14 or 15 trigger the one-shot multivibrator 32, the subsequent output thereof enables transistor switch $Q_{16}$ which in turn couples audio frequency oscillator 33 across power supply 30 for the duration of the period of the one-shot multivibrator 32 whereupon oscillator 33 generates a continuous uninterrupted audio frequency signal during the time when the astable multivibrator 31, transistors $Q_{11}$ and $Q_{12}$, is inactive.

Astable multivibrator 31 is normally inactive during the period that channel 15 is activated. A pulse developed by channel 15 is not only coupled to the input of one-shot multivibrator 32 but also to the base of transistor $Q_8$ of flip-flop 35 driving it into saturation, if it is not already in this state, whereby transistor switch $Q_{10}$, which is operative to couple astable multivibrator 31 across power supply 30, is biased off. The common emitter circuit of astable multivibrator 31 is connected to the collector of transistor switch $Q_{10}$ which has its emitter connected to common circuit 21 and the base thereof coupled through means of emitter follower $Q_9$ to the collector of transistor $Q_8$. The output of astable multivibrator 31, taken at the collector of transistor $Q_{12}$, is coupled to the base of emitter follower $Q_{15}$ which has its collector connected to positive poled conductor 20 and its emitter in series with the base voltage divider 42 of transistor $Q_{17}$ of audio frequency oscillator 33 whereby said oscillator 33 is turned off and on at the frequency of astable multivibrator 31 when activated by the flip-flop 35 through transistor switch $Q_{10}$ which occurs when a pulse from channel 14 which is applied to the base of transistor $Q_7$ causes it to go into saturation whereupon the potential at the collector of transistor $Q_8$ rises biasing emitter follower $Q_9$ into a conductive state to bias transistor switch $Q_{10}$ on coupling astable multivibrator 31 across power supply 30 and thus enabling it. During the time that astable multivibrator 31 is switched on by action of transistor switch $Q_{10}$, the collector of transistor $Q_{12}$ is switched back and forth between +12 volts and about half a volt at the rate of two times per second and is the output of astable multivibrator 31 that is applied to the base of emitter follower $Q_{15}$ causing the emitter thereof to go alternately between +11.5 volts and about half a volt biasing audio frequency oscillator on and off whereby its output signal comprises an audio signal switched on and off at the rate of 2 cycles per second consisting of "beeps" instead of a steady tone signal as when a pulse from channel 15 is coupled to flip-flop 35 and one-shot multivibrator 32. Thus, audio frequency oscillator 33 will start either as a steady tone signal or as an interrupted tone signal and will change to the other as the other channel becomes disturbed.

Transistors $Q_{18}$ and $Q_{19}$ comprise a pulse-shaper and switch, respectively. The audio frequency signal output of audio frequency oscillator 33 is taken at the collector of transistor $Q_{17}$ and coupled by means of capacitor 42 to the base of transistor 18 through base resistor 43, appearing as an audio frequency pulse at the collector of transistor $Q_{18}$. Transistor $Q_{18}$ has its emitter connected to the positive poled conductor 20 and its collector to the base of transistor switch $Q_{19}$ through emitter resistor 44. The collector of transistor $Q_{19}$ is connected to the common circuit 44 of crystal controlled radio frequency oscillator $Q_{20}$ and the emitter to common circuit 21. The output of radio frequency oscillator $Q_{20}$ is coupled to radio frequency amplifier $Q_{21}$ for amplification of said output. An antenna 45 coupled to amplifier $Q_{21}$ provides means for radiating the amplified output. When audio frequency oscillator 33 is activated as aforedescribed, the output thereof is coupled by means of capacitor 42 to the base of pulse-shaper $Q_{18}$ resulting in either a steady audio frequency pulse train, as when channel 15 is activated, or a series of audio frequency pulse trains, as when channel 14 is activated, at the collector thereof which are coupled to the base of transistor switch $Q_{19}$ which is thereby enabled. Transistor switch $Q_{19}$ in response to said audio frequency pulses connects radio frequency oscillator $Q_{20}$ across power supply 30 whereby it is activated and applies the steady tone audio frequency pulse or a series "beeps," of audio frequency pulses to radio frequency oscillator $Q_{20}$ causing pulse modulation thereof. The pulse modulated output of oscillator $Q_{20}$ is amplified by amplifier $Q_{21}$, the output of which is radiated by antenna 45. Thus, from the foregoing, it can be seen that the crystal controlled radio frequency oscillator $Q_{20}$ can either be switched on and pulse modulated to produce a steady audio tone pulse modulated radio signal having the duration of one-shot multivibrator 32 or off and on at the rate of 2 cycles per second, the frequency of astable multivibrator 31, and pulse modulated to produce a series of audio tone pulse modulated radio signals indicating which channel has been activated and thereby the location of the disturbance as well as the direction of travel of such disturbance as the other channel becomes activated. These audio tone pulse modulated radio signals are received by radio receiving stations remotely located with reference to the location of the aforedescribed apparatus.

What is claimed is:

1. A transmitting seismic sensor system for real-time directional reporting for the purpose of both transmitting and converting into recognizable form information from geophones spaced along a path in response to acoustic waves in the earth generated therein by traffic flow on the path pass the geophones whereby the direction and volume of the traffic can be determined comprising, in combination: a D.C. power supply coupled to said system for energizing said system; a first geophone positioned adjacent said path on the surface of the earth to detect acoustic waves transmitted therethrough due to traffic on said path; a first electronic channel coupled to said first geophone for producing amplified seismic signals and converting the amplified seismic signals to a trigger pulse at the output thereof; a second geophone positioned adjacent said path on the surface of the earth remote from said first geophones to detect acoustic waves transmitted therethrough due to said traffic as it passes thereby; a second electronic channel coupled to said second geophone for producing amplified seismic signals and converting the amplified seismic signals to a trigger pulse at the output thereof; a transistor audio frequency oscillator adapted to produce a steady or interrupted output signal having the emitter circuit thereof coupled to the common circuit of said system through the output of a first electronic switching device and the input biasing means thereof coupled across the D.C. power supply through an emitter follower; a one-shot multivibrator having the input thereof capacitively coupled through diode means to the output of said electronic channels and the output thereof coupled to the input of said first electronic switching device whereby when either said channel triggers the one-shot multivibrator it cycles to enable said first electronic switching device whereby the transistor audio frequency oscillator is activated; an astable multivibrator having the output thereof coupled to the input of said emitter follower and the common circuit thereof coupled through the output of a second electronic switching device to the common circuit of said system; a bistable multivibrator provided with a first input coupled to the output of said first channel and a second input coupled to the output of said second channel and an output coupled to the input of said second electronic switching device whereby when a trigger pulse from said first channel is applied to said first input said second electronic switching device is enabled coupling the astable multivibrator across the power supply whereby it generates biasing signals which are applied through the emitter follower to said input biasing means to bias said audio frequency oscillator on and off at the frequency of the astable multivibrator to produce an interrupted audio frequency tone signal output, and whereby when a trigger pulse from said second channel is applied to said second input the second electronic switching device is disabled and the audio frequency oscillator produces a steady audio frequency tone signal output; a transistor pulse shaper coupled to the output of the audio frequency oscillator whereby the output of the audio frequency oscillator is converted to pulse tone signals; a radio frequency transmitter having an antenna coupled thereto; a third electronic switching device having an input coupled to and responsive to said pulse tone signals to enable the output thereof coupled between said power supply and said radio frequency transmitter whereby the radio frequency transmitter is coupled across the power supply and the pulse tone signals are applied to and pulse modulate said transmitter to provide identifying pulse modulated radio frequency signals indicative of the direction of travel of said traffic.

2. The invention in accordance with claim 1 wherein said first and second electronic channels each comprise in combination: a transistor class A amplifier coupled to said geophone for producing amplified seismic signals at the output thereof; a pair of diodes connected in opposite conducting directions to each other across input of said class A amplifier for preventing excessive voltage from the geophone being applied thereto; a multistage transistor class A amplifier for further amplifying the amplified seismic signals; an emitter follower coupling said class A amplifier and said multistage class A amplifier; an integrator capacitor provided with a voltage divider in parallel therewith and having one terminal coupled to the common circuit of said system; a rectifier coupled in series with another terminal of the integrator capacitor and the output of said multistage class A amplifier whereby the further amplified seismic signals are rectified and charge the integrator capacitor; and a complementary transistor trigger having the input thereof coupled to an intermediate point on said voltage divider and responsive to a portion of the voltage developed across said divider due to charging of the integrator capacitor to produce said trigger pulse.

3. The invention in accordance with claim 2 wherein said first electronic switching device comprises a transistor having base, emitter and collector elements, said base element connected to the output of the one-shot multivibrator, said emitter element connected to the emitter circuit of the audio frequency oscillator, and said emitter element connected to the common circuit of said system.

4. The invention in accordance with claim 3 wherein said second electronic switching device comprises a transistor having base, emitter and collector elements, said base element coupled through an emitter follower to the output of the bistable multivibrator, said collector element connected to the common circuit of the astable multivibrator and said emitter element connected to the common circuit of said system.

5. The invention in accordance with claim 4 wherein said third electronic switching device comprises a transistor having base, emitter and collector element, said base element coupled to the output of said transistor pulse shaper, said collector element coupled to the common circuit of said radio frequency transmitter, and said emitter element coupled to the common circuit of said system.

* * * * *